United States Patent [19]
Parker

[11] Patent Number: 5,666,470
[45] Date of Patent: Sep. 9, 1997

[54] METHOD AND APPARATUS FOR APPEARANCE TUNING OF BITMAP IMAGES

[75] Inventor: James D. Parker, Rochester, N.Y.

[73] Assignee: Xerox Corporation, Stamford, Conn.

[21] Appl. No.: 496,556

[22] Filed: Jun. 29, 1995

[51] Int. Cl.⁶ .................................................. G06K 15/00
[52] U.S. Cl. .......................................... 395/106; 395/102
[58] Field of Search .................................. 395/102, 115, 395/106, 333–335, 200.18, 834, 892, 893; 382/209, 212, 217–220, 254, 306, 215; 358/455–460

[56] References Cited

U.S. PATENT DOCUMENTS

| | | | |
|---|---|---|---|
| 4,544,264 | 10/1985 | Bassetti et al. | 355/14 R |
| 4,625,222 | 11/1986 | Bassetti et al. | 346/160 |
| 4,847,641 | 7/1989 | Tung | 346/154 |
| 5,005,139 | 4/1991 | Tung | 364/519 |
| 5,029,108 | 7/1991 | Lung | 364/519 |
| 5,404,411 | 4/1995 | Banton et al. | 389/54 |
| 5,408,329 | 4/1995 | Mailloux et al. | 358/298 |

OTHER PUBLICATIONS

"Morphological Image and Signal Processing"; *6.2 Erosion and Dilation in the Euclidean Space;* pp.158–167.
Stuffel and Morelana; "A Survey of Electronic Techniques for Pictorial Image Reproduction"; *IEEE Transactions on Communications;* vol. Com. 29 No. 12 Dec., 1981.
J. Randolph Sandors et al. "Behind Hewlett–Packard's Patent on Resolution Enhancement Technology"; pp. 1–61,.
Edward R. Dougherty; "Mathematical Morphology in Image Processing"; Chapter 2, pp. 43–90.

*Primary Examiner*—Arthur G. Evans
*Attorney, Agent, or Firm*—Duane C. Basch

[57] ABSTRACT

The present invention is a method and apparatus for tuning the appearance of bitmap images rendered on a printing system. The invention operates to recognize those pixels with a bitmap image that are appropriate for alteration, and, in response to downloadable output values, tunes the identified pixels so as to assure a desired output thereof

14 Claims, 7 Drawing Sheets

FIG. 10

|  |  | $X_0$ |  |  |
|---|---|---|---|---|
|  |  | $X_1$ |  |  |
| $X_2$ | $X_3$ | $X_4$ | $X_5$ | $X_6$ |
|  |  | $X_7$ |  |  |
|  |  | $X_8$ |  |  |

METHOD AND APPARATUS FOR APPEARANCE TUNING OF BITMAP IMAGES

This invention relates generally to the customization of the appearance of bitmap images rendered by a printing system, and more particularly to a method and apparatus for detecting the presence of image regions requiring appearance tuning and generating appropriate output signals to accomplish the tuning.

CROSS REFERENCE

The following related application is hereby incorporated by reference for its teachings:

"MULTIFUNCTIONAL ARCHITECTURE FOR APPEARANCE TUNING AND RESOLUTION RECONSTRUCTION OF DIGITAL IMAGES," A. Frumusa, B. Coonan, A. Nacman, F. Tse and M. Davidson, application Ser. No. 08/496,654, filed concurrently herewith.

BACKGROUND AND SUMMARY OF THE INVENTION

The present invention is intended to enable the user-specified appearance tuning of a bitmap image output by a printing system. Using an appearance tuning technique, it is possible to render printed output on a particular image output terminal (IOT) that can be made to emulate the output characteristics of a variety of well-known printers. For example, the present invention allows a user to select a printer emulation so that the resulting output appears as though it had been rendered by a printer of the type emulated (e.g. dark prints for HP LaserJet emulation or light prints for offset printing).

Using morphological-like techniques such as erosion and dilation, the present invention facilitates the identification of specific pixel structures within a bitmap image. Once identified, the structures may be modified or "tuned" so as to appear in the fashion desired once they are rendered by an IOT.

Heretofore, a number of patents and publications have disclosed template-based image filters for image enhancement and resolution conversion, the relevant portions of which may be briefly summarized as follows:

U.S. Pat. Nos. 4,544,264 and 4,625,222 to Bassetti et al., disclose enhancement circuits suitable for use in a laser based electrophotographic printing machine. The enhancements are directed at modifying the digital drive signals used to produce the image, including smoothing digitized edges and broadening fine lines in both the horizontal and vertical directions. Leading and trailing edge signals, in both directions are provided to potentially print each black pixel or line as a series of three pixels, a gray leading pixel, overlapped by a central black pixel, which is in turn overlapped by a gray trailing pixel. A similar process is applied for scan lines as well. The series of signals are recombined to effectively control the voltage and current levels of a laser driver.

U.S. Pat. Nos. 4,847,641 and 5,005,139 to Tung, teach print enhancement circuitry for a laser beam printer. The bit map of a region of the image to be output is compared to a number of patterns or templates. When a match is detected, a section of the bitmap that was matched is replaced with a unique bitmap section designed to compensate for errors. The replacement bitmap section may include predetermined shifting of some dot positions to compensate for the error in the original bitmap section.

U.S. Pat. No. 5,029,108 to Lung teaches an edge enhancement method and apparatus for dot matrix devices wherein a group of gradient mask matrices are applied to a matrix of pixels surrounding a "to be adjusted pixel" so as to determine the existence of an edge and the direction of the brightness change. Once determined, the factors are used to generate a code used to modify the to be adjusted pixel in order to enhance the smoothness of a segment transition.

U.S. Pat. No. 5,408,329 to Mailloux et al., discloses the use of digital darkness control or pixel stretch techniques in electronic imaging devices regardless of differences in development systems (e.g., write-white or write-black). The inventors note that it it is important to match images or have images look alike regardless of the particular system in a given machine that is used in developing the image. Accordingly, the invention provides an electronic adjustment to an original image in order to compensate for various development systems as well as to compensate for quality settings within a given development system. Employed are sets of decoding rules applicable to 2×2 or 3×3 arrays of image pixels to accomplish darkness adjustment for a given pixel matrix.

U.S. patent application Ser. No. 07/513,415, and the corresponding Japanese laid-open patent publication 4-227584 published Aug. 17, 1992, to Mailloux et el. disclose a method to enable the conversion of binary image data originally generated at a lower resolution into representative binary image data of a higher resolution, wherein the conversion ratio, or magnification factor, is an integer value. Included within the resolution magnification invention are methods for smoothing the interpolated output image and thereby reducing objectionable visual characteristics observable in digitally encoded data using conventional magnification techniques.

A number of patents and publications are summarized in Torrey Pines Research, *Behind Hewlett-Packard's Patent on Resolution Enhancement™ Technology*, (Becky Colgan ed., BIS CAP International, 1990) pp. 1–60, including concepts associated with resolution enhancement.

James C. Stoffel et al. in *A Survey of Electronic Techniques for Pictorial Image Reproduction*, IEEE Transactions on Communications, Vol. COM-29, No. 12, December 1981 discloses image processing algorithms that can be used to transform continuous tone and halftone pictorial image input into spatially encoded representations compatible with binary output processes. A set of image quality and processing complexity metrics are also defined so as to evaluate a number of image processing algorithms with respect to their ability to reproduce continuous tone or halftone pictorial input.

*Mathematical Morphology in Image Processing*, pp. 43–90 (Edward R. Dougherty ed., Marcel Dekker 1992) describes efficient design strategies for the optimal binary digital morphological filter. A suboptimal design methodology is investigated for binary filters in order to facilitate a computationally manageable design process.

In accordance with the present invention, there is provided a method for selectively tuning the printed output of an electronic printing system capable of producing printed output from a print engine in response to a bitmap image consisting of a plurality of input image signals, comprising the steps of:

storing, in memory, at least a portion of the input image signals forming the bitmap image;

identifying, using a template matching operation applied to the signals stored in the bitmap image memory, pixel values associated with pixel positions to be selectively tuned;

for those pixel positions identified to be selectively tuned, producing a pixel code and transmitting the pixel code to a programmable look-up table to generate a pulse-width position-modulated output signal that is supplied to the print engine; otherwise passing the pulse-width position-modulated output signal signals directly to the print engine.

In accordance with another aspect of the present invention, there is provided an apparatus for selectively tuning the output of an electronic printing system capable of producing printed output from a print engine in response to a bitmap image consisting of a plurality of input image signals, comprising:

a bitmap image memory for storing at least a portion of the plurality of input image signals;

a template matching logic circuit to identify, within the bitmap image memory, image signals associated with pixel positions to be selectively tuned;

a pixel code generator, responsive to said template matching logic circuit, for generating a pixel code for each pixel position identified to be selectively tuned; and a look-up table, responsive to the pixel code received from said pixel code generator, for generating a pulse width position modulated output signal that is supplied to the print engine to control the output thereof.

One aspect of the invention is based on the observation of problems with conventional printing systems. Such systems, although they may be capable of rendering images received in a page description language (PDL) such as Interpress (Xerox Corp.) or Postscript (Adobe Corp.), typically render the image in accordance with the appearance determined as a result of the particular marking engine employed. However, such systems may result in user dissatisfaction because of an expectation of the appearance, based in part upon the WYSIWYG document preparation software and/or prior prints produced on other printers (e.g., dedicated workstation or desktop printers).

This aspect is based on the discovery of a technique that alleviates these problems by allowing the user to specify a desired appearance for the output print. This technique can be implemented, for example, by allowing the user to specify the level of density (lightness/darkness) with which the image is to be printed. A machine implementing the invention can include a laser-based electronic printing system, wherein the laser beam intensity or exposure level may be modified via pulse width position modulation (PWPM).

BRIEF DESCRIPTION OF THE DRAWINGS

FIG. 10 is an illustration of a 5×5 context window employed in one embodiment of the present invention;

Figure 2:
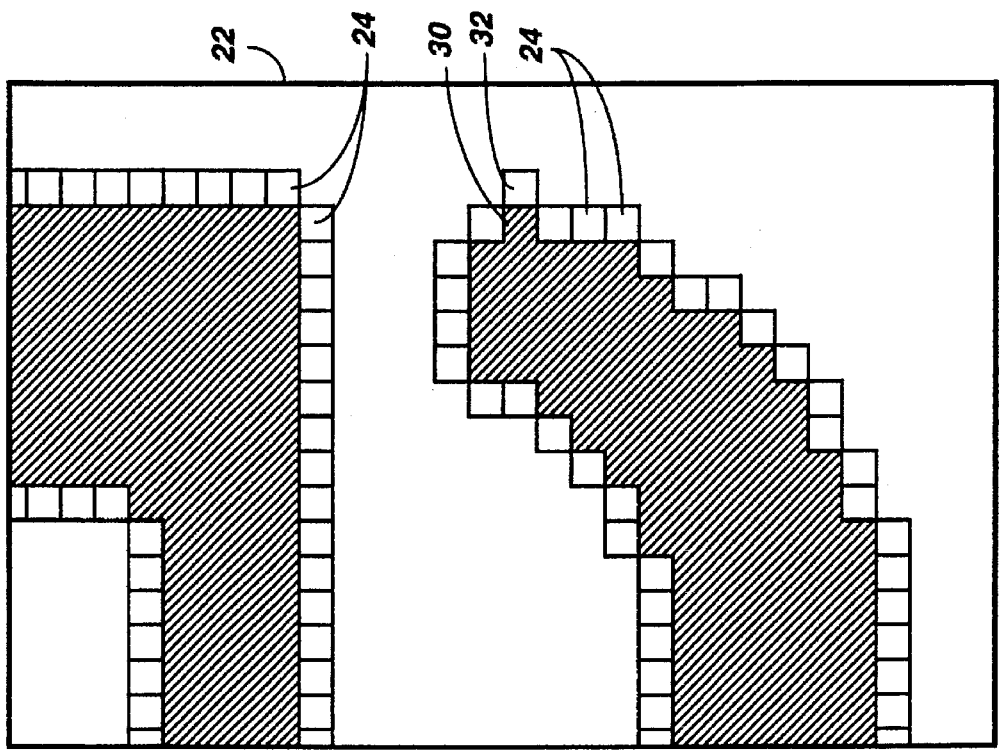
FIG. 2 is an enlarged representation of the bitmap segment of FIG. 1 illustrating a dilation operation accomplished in accordance with the present invention.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE PREFERRED EMBODIMENT

For a general understanding of the present invention, reference is made to the drawings. In the drawings, like reference numerals have been used throughout to designate identical elements. In describing the present invention, the following term(s) have been used in the description.

The term "data" refers herein to physical signals that indicate or include information. When an item of data can indicate one of a number of possible alternatives, the item of data has one of a number of "values." For example, a binary item of data, also referred to as a "bit," has one of two values, interchangeably referred to as "1" and "0" or "ON" and "OFF" or "high" and "low." An N-bit item of data has one of $2^N$ values. A "multibit" item of data is an item of data that includes more than one bit.

The term "data" includes data existing in any physical form, and includes data that are transitory or are being stored or transmitted. For example, data could exist as electromagnetic or other transmitted signals or as signals stored in electronic, magnetic, or other form.

An item of data "defines" an image when the item of data includes sufficient information to produce the image. For example, a two-dimensional array can define all or any part of an image, with each item of data in the array providing a value indicating the color of a respective location of the image. A "raster" is a one-dimensional array of image data, reflecting a single line of data across a single dimension (length or width) of the image.

Each location in an image may be called a "pixel." In an array defining an image in which each item of data provides a value, each value indicating the color of a location may be called a "pixel value". Each pixel value is a bit in a "binary form" of an image, a gray scale value in a "gray scale form" of an image, or a set of color space coordinates in a "color coordinate form" of an image, the binary form, gray scale form, and color coordinate form each being a two-dimensional array defining an image.

An item of data "relates to" part of an image, such as a pixel or a larger segment of the image, when the item of data has a relationship of any kind to the part of the image. For example, the item of data could define the part of the image, as a pixel value defines a pixel; the item of data could be obtained from data defining the part of the image; the item of data could indicate a location of the part of the image; or the item of data could be part of a data array such that, when the data array is mapped onto the image, the item of data maps onto the part of the image. An operation performs "image processing" when it operates on an item of data that relates to part of an image.

A "neighborhood operation" is an image processing operation that uses data relating to one part of an image to obtain data relating to another part of an image.

A segment of an image is adjacent to another segment of the image "along an edge" if the two adjacent segments meet at the edge and do not overlap.

Pixels are "neighbors" or "neighboring" within an image when there are no other pixels between them and they meet an appropriate criterion for neighboring. If the pixels are rectangular and appear in rows and columns, each pixel may have 4 or 8 neighboring pixels, depending on the criterion used.

The term "appearance tuning" refers to the lightening or darkening (density control) of a pixel in conjunction with the repositioning of the pixel relative to one or more neighboring pixels.

An "edge" occurs in an image when two neighboring pixels have sufficiently different pixel values according to an appropriate criterion for the occurrence of an edge between them. The term "edge pixel" may be applied to one or both of two neighboring pixels between which an edge occurs.

An "image characteristic" or "characteristic" is a measurable attribute of an image. An operation can "measure" a characteristic by producing data indicating the characteristic using data defining an image. A characteristic is measured "for an image" if the characteristic is measured in a manner that is likely to produce approximately the same result each time it occurs.

"Circuitry" or a "circuit" is any physical arrangement of matter that can respond to a first signal at one location or time by providing a second signal at another location or time. Circuitry specifically includes logic circuits existing as interconnected components, programmable logic arrays (PLAs) and application specific integrated circuits (ASICs). Circuitry "stores" a first signal when it receives the first signal at one time and, in response, provides substantially the same signal at another time. Circuitry "transfers" a first signal when it receives the first signal at a first location and, in response, provides substantially the same signal at a second location.

"Memory circuitry" or "memory" is any circuitry that can store data, and may include local and remote memory and input/output devices. Examples include semiconductor ROMs, RAMs, and storage medium devices with data storage media that they can access. A "memory cell" is memory circuitry that can store a single unit of data, such as a bit or other n-ary digit or an analog value.

"User input circuitry" or "user interface circuitry" is circuitry for providing signals based on actions of a user. User input circuitry can receive signals from one or more "user input devices" that provide signals based on actions of a user, such as a keyboard, a mouse, a joystick, a touch screen, and so forth. The set of signals provided by user input circuitry can therefore include data indicating mouse operation, data indicating keyboard operation, and so forth. Signals from user input circuitry may include a "request" for an operation, in which case a system may perform the requested operation in response.

An "image input terminal" (IIT) or "image input device" is a device that can receive an image and provide an item of data defining a version of the image. A "scanner" is an image input device that receives an image by a scanning operation, such as by scanning a document.

An "image output terminal" (IOT) or "image output device" is a device that can receive an item of data defining an image and provide the image as output. A "display" is an image output device that provides the output image in human viewable form. The visible pattern presented by a display is a "displayed image" or simply "image." Printers or printing systems are other examples of image output terminals.

Figure 1:
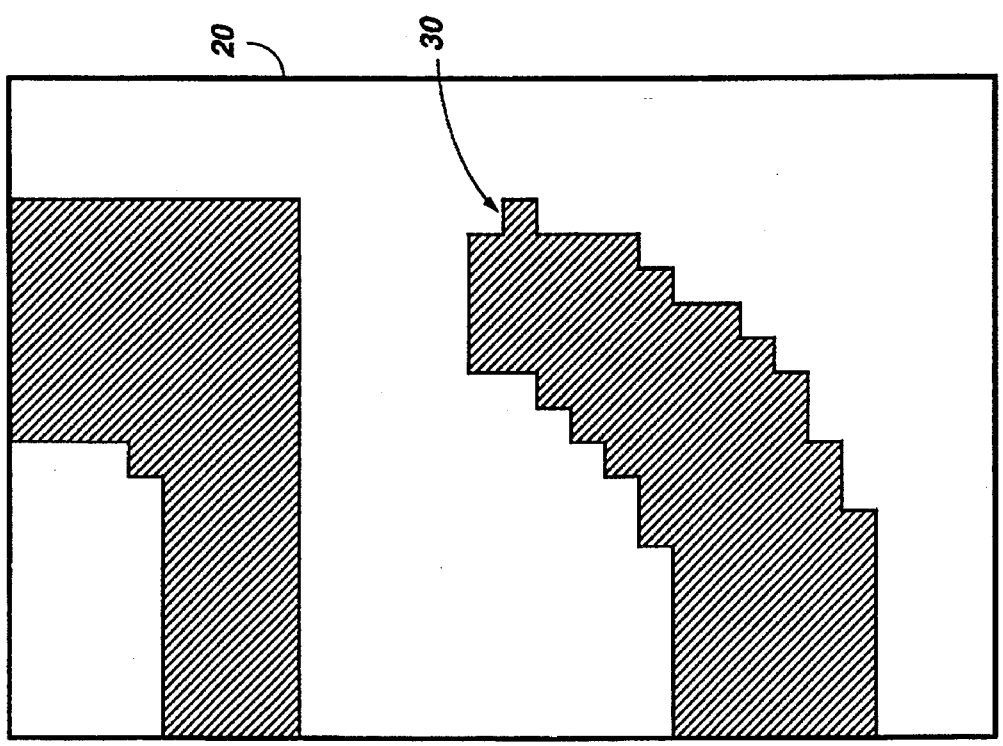
FIG. 1 is an enlarged representation of a segment of a bitmap image.

Referring first to FIGS. 1 and 2, displayed therein are highly magnified segments of an image bitmap printed or displayed on an image output device. In particular, FIG. 1 illustrated image segment 20, wherein the image segment displays a 600 spot per inch (spi) representation of a portion of a text character. In many applications, it may be preferred to enlarge the exposed area of the text character in a manner sufficient to increase the "darkness" or density of the print. Such an example is depicted in FIG. 2, where the text character segment 22 is illustrated, now with a dilated region around the outer boundaries of the text character. In particular, the dilated region includes the dilated pixels depicted by reference numeral 24. In general, this type of dilation operation, and an associated erosion operation (not shown) are described as Minkowski addition and subtraction, respectively, as generally disclosed by I. Pitas and A. N. Venetsanopoulos in "Nonlinear Digital Filters: Principles and Applications," Kluwer Academic Publishers (1990), pp. 158–167.

The present invention extends the dynamic range of a Minkowski-like operation by enabling the study of larger context areas in the image to be processed, and by extending the applicability of such techniques to multiple bit per pixel input images. As a result of multiple bit per pixel operations sub-pixel modulation of the exposure device is possible, resulting in better control of the density of a printed bitmap image. A simplified example of a number of possible sub-pixel modulation cases are illustrated in FIGS. 3 through 6.

Figure 3:
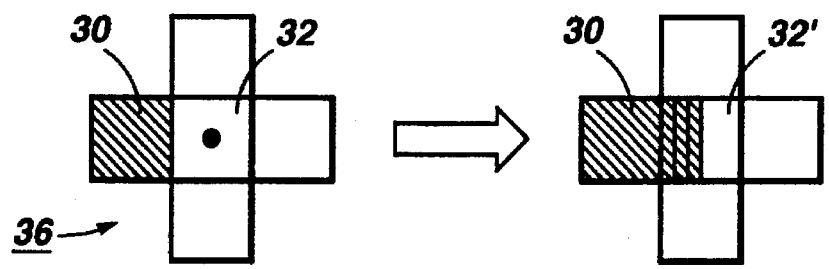
FIGS. 3-6 are illustrations of possible sub-pixel modulation for the four possible dilation operations in a 3×3 context window.
Figure 4:
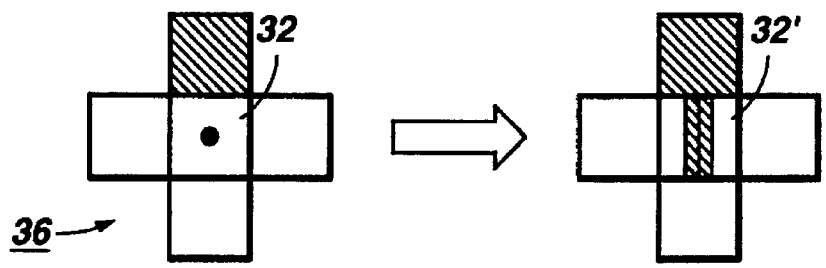
Figure 5:
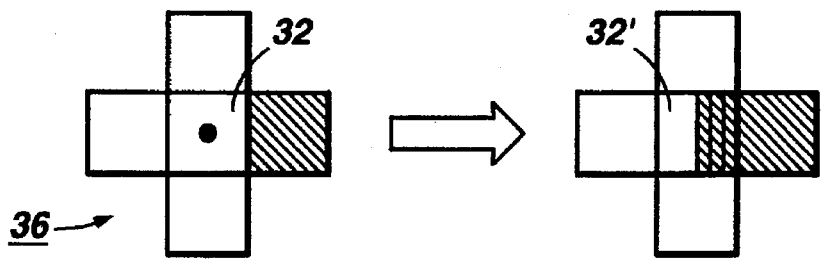
Figure 6:
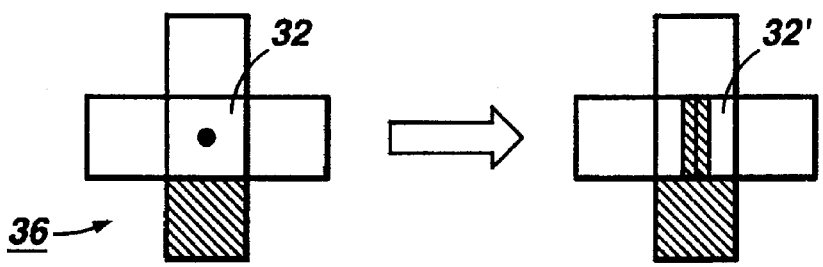

FIG. 3, for example, illustrates the operation that might be employed to render pixel 30 of FIG. 1 in a horizontally dilated fashion so as to appear as pixels 30 and 32 in FIG. 2. As shown in FIG. 3, target pixel 32 is identified by a context sensitive window 36, preferably represented herein as a "+" shaped window, although not specifically limited thereto. Target pixel 32 appears at the center of a neighborhood of pixels that define the context window. Whenever the pattern of context window 36 is identified within the bitmap, the printing system will automatically determine what, if any, processing must be accomplished to tune the appearance of the output print. In the exemplary case of a dilation operation, shown in FIGS. 3 through 6, the target pixel (32) adjacent to a black pixel (30) is rendered with a programmable amount of sub-pixel modulation (depicted as partial pixel increments in output pixel 32'). In other words, a mark smaller in size than a full black pixel is placed by the output device. In a manner similar to FIG. 3, FIGS. 4, 5 and 6, each respectively depict a vertical-downward, horizontal-left and vertical-upward appearance tuning operation with respect to a target pixel 32.

Having generally described the appearance tuning operation, the following description will further describe two exemplary embodiments for the present invention. The first embodiment is a general hardware embodiment for binary image appearance tuning. The second embodiment is directed to multiple bit per pixel appearance tuning and will be described with respect to a preferred apparatus therefor. Both embodiments will be described with respect to a printing system suitable for receiving raster-based input from any number of image input terminals including, but not limited to, a computer workstation or an electronic subsystem (ESS) which receives image data from a network or other image source. The ESS may further process the image using well-known image processing operations implemented therein, prior to passing the rasterized bitmap data to the printing system employing the present invention.

Figure 7:
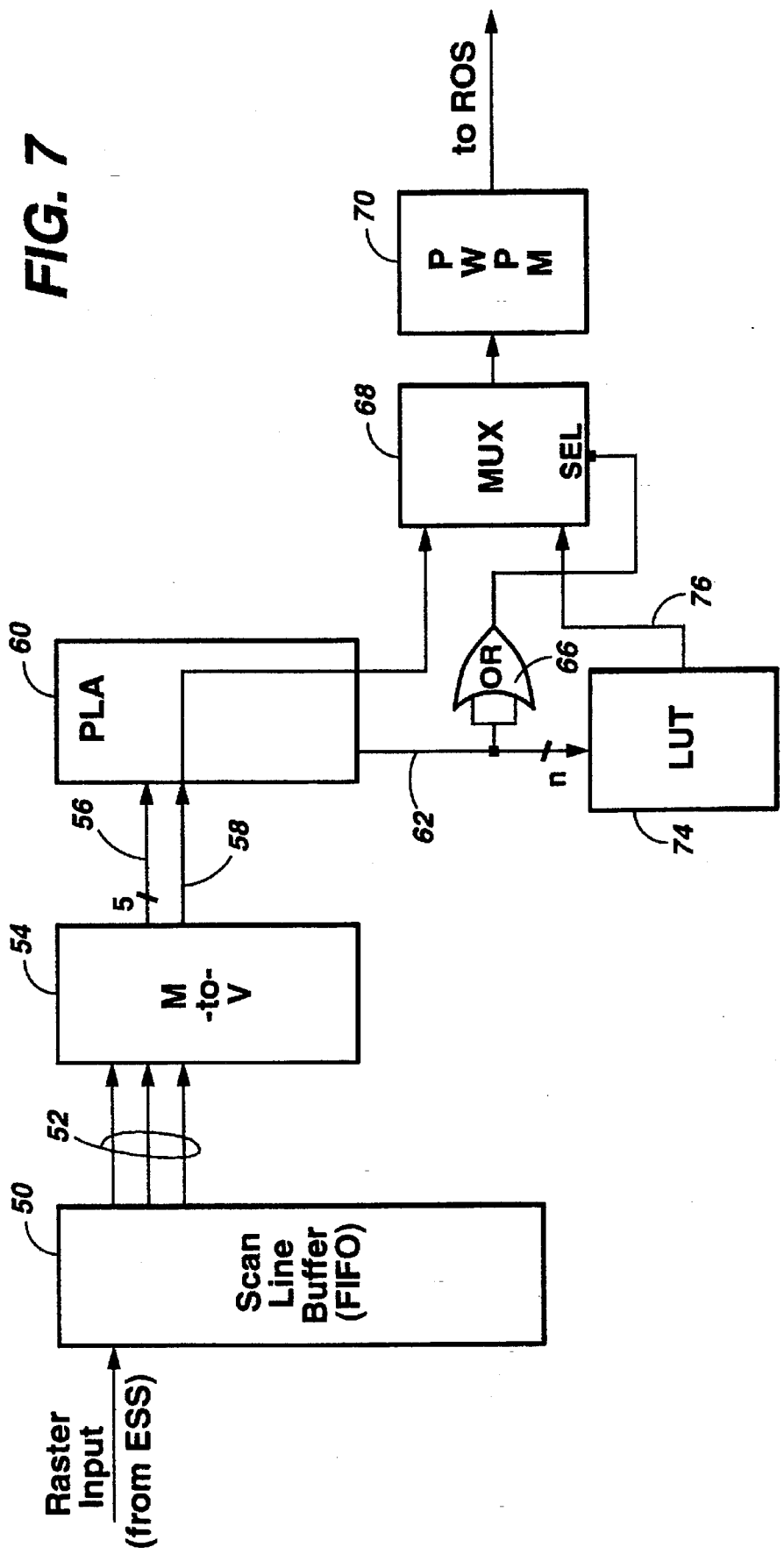
FIG. 7 is a schematic block diagram of a binary embodiment of the present invention.
Figure 8:
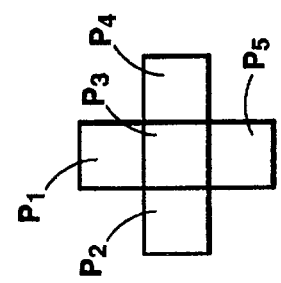
FIG. 8 is an illustration of a 3×3 context window employed in one embodiment of the present invention.

The first embodiment, as depicted schematically in FIG. 7, is designed to receive rasters of image data from the ESS and store the data, sequentially in a scan line buffer 50 in first-in, first-out (FIFO) format. Scan line buffer 50 may be implemented as a series of one-dimensional shift registers whereby the image data, in the form of binary pixel values is passed into one end and shifted in response to a pixel clock. Once stored in the buffer 50, the image data for the specified context window, as represented by window 48 of FIG. 8, is selected via hardwire connections to represent the binary values of the target pixel and neighboring adjacent pixels. In particular, lines 52 of FIG. 7 transfer the pixel values for the context window (three lines representing pixels from three rasters in the "+" context) to the input of the Matrix-to-Vector conversion block 54. Conversion Block 54 converts the the bitmap image data values from the context window into a 5-bit parallel "vector" (lines 56) and a one-bit center pixel signal (line 58). Once converted, the data is passed to a programmable logic array (PLA) 60, where the center pixel signal is passed through the device unaltered and the 5-bit context data is compared to templates logically represented therein to identify matches. In particular, if a template represented in the PLA, for example the template depicted in FIG. 3, is matched the PLA will output on lines 60 a non-zero value indicating the number or code of the template that was matched. Otherwise, if there is no template match, the PLA outputs a zero code on the output lines 60. When a zero code is output, a "0" is passed from OR gate 66 to the select input of MUX 68 so as to enable the target pixel value to pass directly to the pulse width position modulation (PWPM) driver 70 and on to the raster output scanner (ROS).

In response to the non-zero output on lines 62, OR gate 66 outputs a binary "1" to the MUX and the output of look-up table (LUT) 74 is utilized by PWPM driver 50 to control the ROS. In particular, LUT 74 is a programmable look-up table wherein the n-bit input on lines 62 is utilized as an address to cause the output of the appropriate PWPM signal on line 76. LUT 74 is preferably a programmable device, capable of having the contents stored therein downloaded to the LUT in response to a user input. In particular, the data is downloaded in response to a selection of the density or appearance tuning level desired by a user. Thus, upon identifying a context window pattern in PLA 62, the PWPM signal output by LUT 74 will result in a dilated or eroded target pixel when the target pixel is rendered by the ROS associated with the printing system.

Figure 9:
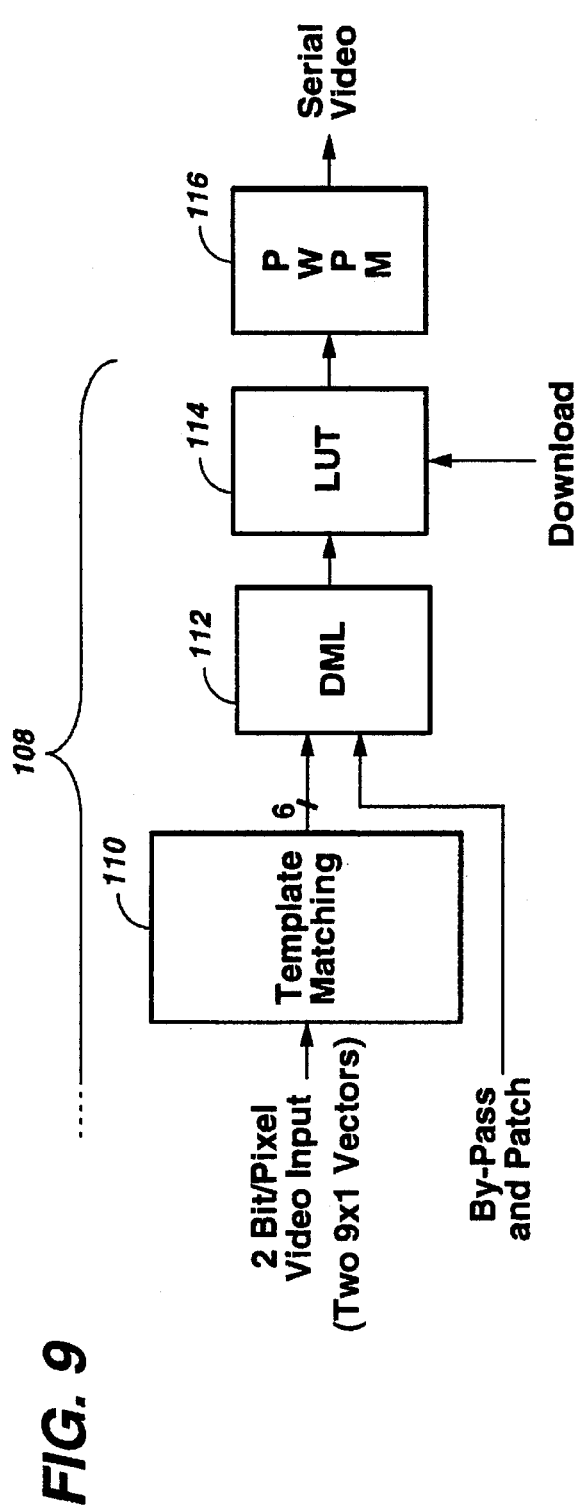
FIG. 9 is a data flow diagram of a multiple bit per pixel embodiment of the present invention.

Having described the general binary implementation of the present invention, the operation of a preferred multiple bit per pixel embodiment will be described. Such an embodiment is particularly well suited for, and will be described with respect to, a printing system capable of rendering output in response to gray scale image data represented in the form of 2-bits per pixel. In particular, a multiple bit per pixel embodiment requires modification of the PLA logic structure as the PLA is not well suited to non-binary input. A further simplifying assumption is made in order to adapt the general binary template recognition architecture to a 2-bit per pixel architecture as depicted in FIG. 9. The assumption is that in reducing a multiple bit per pixel image to a 2-bit per pixel image, the incidence of gray (non-white and non-black) pixels only occurs adjacent to black pixels, and then only in segments of the image where there is a black-white boundary or edge. This assumption is particularly true for text and line art as well as for compact dot growth halftones. The simplifying assumption results in a reduction of the number of possible templates and allows the templates to be treated on an individual basis in a PLA or ASIC.

Specifically, for the reduced bit per pixel context (2-bit), the possible target pixels in the context window could be gray, white or black. The appearance of a gray target pixel will always trigger a template because the grays are always selected to be appearance tuned. On the other hand, a black or white target pixel requires two separate paths for appearance tuning. The first path checks for erosion identification and the second path checks for dilation identification. Thus, a black pixel sent to check for dilation will be passed through; it is not possible to render a black pixel more black. Similarly, a white pixel sent through the path to check for erosion will not trigger a template match. The remaining cases, non-black dilation and non-white erosion, may be treated by the binary template matching operations previously described if additional logic operations are applied to the pixel values in the context window as will be described with respect to the multiple bit appearance tuning architecture of FIG. 9.

Figure 10:
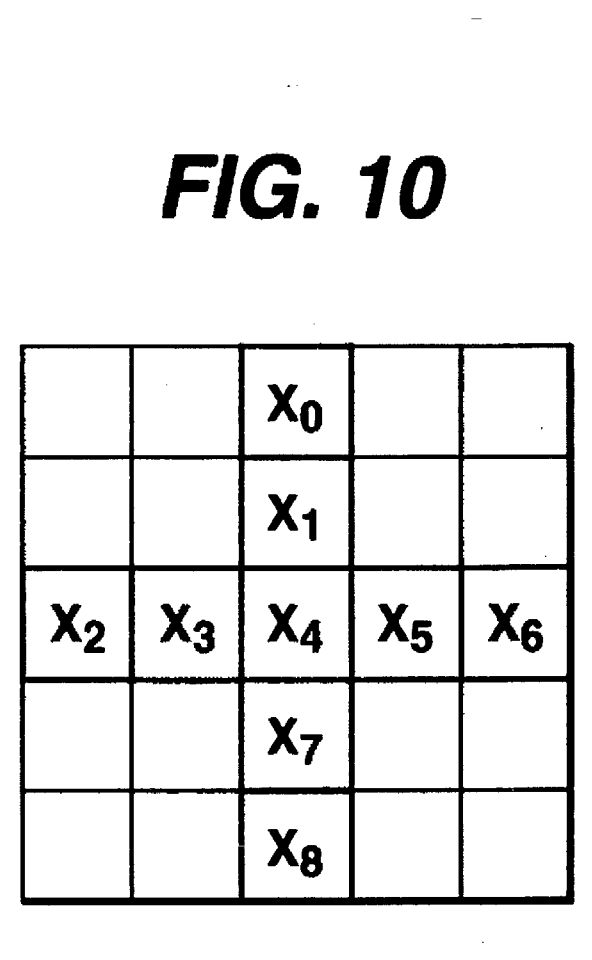

In FIG. 9, there is illustrated a data flow diagram of the raster-to-video architecture employed in an embodiment of the 2-bit per pixel printing system. The architecture is preferably designed for a dual beam, underfilled raster output scanning IOT. Logically, the image processing section 108 of such a printing system receives digital image data from an image source (not shown), performs the required image processing functions, and passes serial analog video to the raster output scanning electronics, including the laser diode which images a photoconductor. More specifically, the incoming serial video stream at 2-bits per pixel is processed through a series of FIFOs, as previously described, to construct a square 5×5 image segment from which the pixel context associated with the template matching operation (block 110) is determined. Downstream of the FIFOs the video path is split into two paths, one for each of the high and low order bits. The image processing operations for each path are the same and are performed in parallel. The 5×5 image segment illustrated in FIG. 10, converted into a pair of 25×1 parallel vectors at the FIFOs, has two 5×5 "+" patterns of nine pixels ($X_1$–$X_8$) formed from the larger vector, and the resulting vector of nine pixels (high and low order bits) is input into the template matching block 110, preferably implemented as a gate array. The 6-bit output from the template matching block 110 is a coded value that is sent via a digital multiplexing latch (DML) 112 to look-up table (LUT) 114 for interpretation. DML 112 functions as a latch that controls which signal (the output of template matching block 110 or the bypass) is passed to the LUT 114. During normal operation (the printing of a page), the bypass does not operate and all signals are relayed from the template matching block 110. For testing and calibration during an interdocument gap, signals from the bypass input may be used to expose test patches on the photoconductor. As illustrated, the values stored in LUT 114 are downloadable, preferably on a job-by-job basis to obtain the desired output density characteristics. The 8-bit output signal produced by LUT 114 contains both pixel position and pixel width information to be interpreted by the pulse-width position-modulation (PWPM) chip 116 to enable sub pixel modulation at the raster output scanner.

Figure 11:
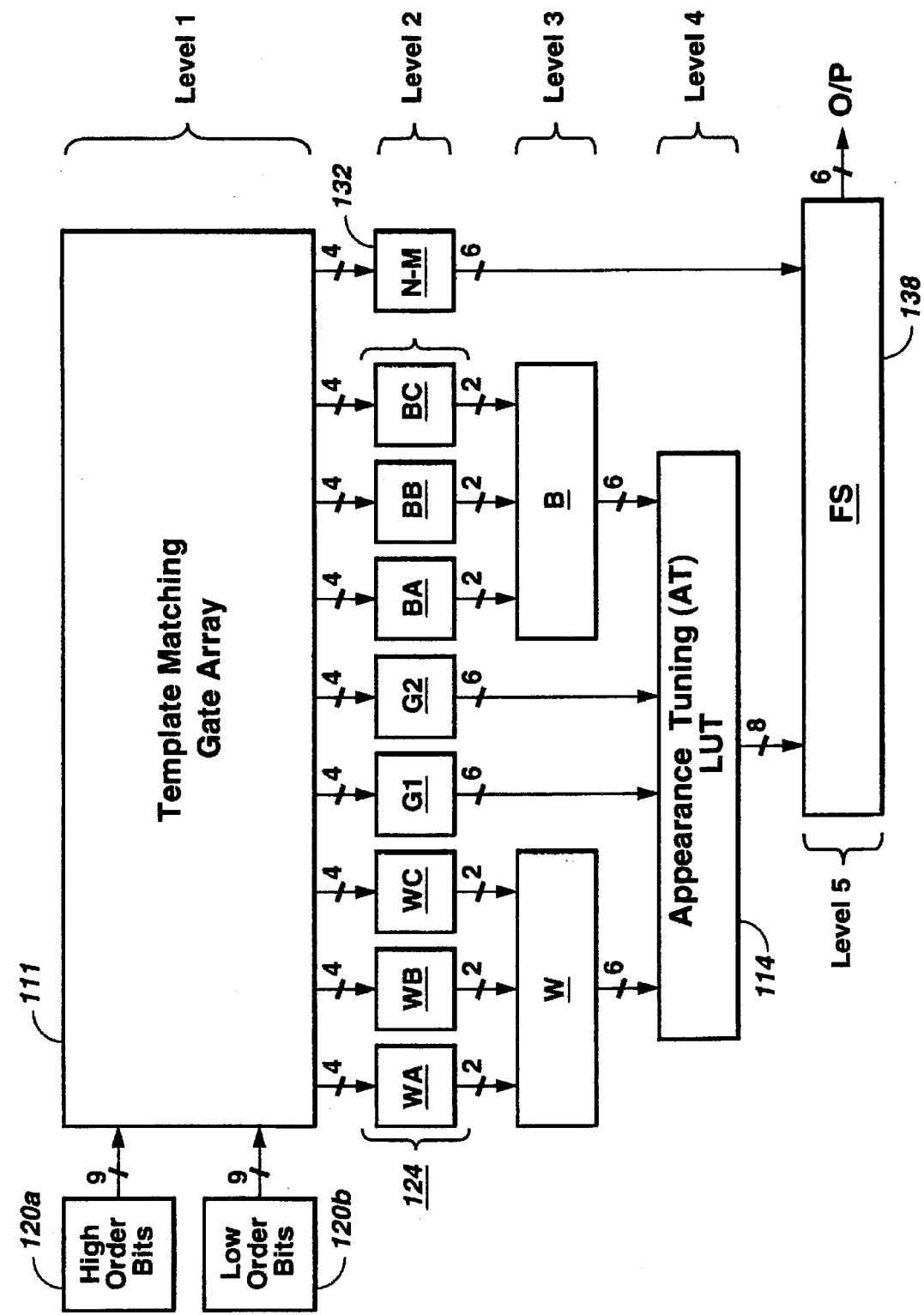
FIG. 11 is a schematic block diagram of the multiple bit embodiment of the present invention.

Further details of the appearance tuning architecture are illustrated in FIG. 11, where there is shown hardware components suitable for implementing a template matching procedure which implements the morphological operation of Minkowski addition with a small structuring element in the gray domain. The architecture is preferably a 2-channel design embedded within an application specific integrated circuit (ASIC). The two channels are identical for the high and low order bits of the 2-bit input and, for reasons of simplicity, the following description will be directed to a single channel only. The input context for the template matching gate array 111 consists of 9 pixels, represented by the 9-bit high and low order buffers 120a and 120b, respectively. The inputs are then compared to templates implemented in the template matching gate array 111 to identify matching patterns for the context pixels. Table A is an illustration of exemplary templates employed to detect the presence of those context pixel patterns identified as requiring appearance tuning.

produce multiple non-zero outputs to the Level 2 blocks. Non-zero output to blocks WA, WB, and WC would originate with a white center pixel; non-zero output to blocks G1 and G2 would originate with a gray center pixel; non-zero output to blocks BA, BB, and BC would originate with a black center pixel; and the output to block N-M is always non-zero. The output of the Level 2 blocks can be summarized as follows:

| WA | white center pixel, left density adjustment |
| WB | white center pixel, right density adjustment |
| WC | white center pixel, upper or lower (center) density adjustment |
| G1 | gray 1 center pixel, left density adjustment |
| G2 | gray2 center pixel, right density adjustment |
| BA | black center pixel, left density adjustment |

TABLE A

| INPUTS | | | | | | | | | OUTPUTS | | | | | | COMMENTS |
|---|---|---|---|---|---|---|---|---|---|---|---|---|---|---|---|
| $X_0$ | $X_1$ | $X_2$ | $X_3$ | $X_4$ | $X_5$ | $X_6$ | $X_7$ | $X_8$ | $B_5$ | $B_4$ | $B_3$ | $B_2$ | $B_1$ | $B_0$ | |
| — | — | — | B | $\underline{W}$ | W | — | — | — | 1 | 0 | 0 | 0 | 0 | 0 | |
| — | — | — | W | $\underline{W}$ | B | — | — | — | 1 | 0 | 0 | 0 | 0 | 1 | binary |
| — | B | — | — | $\underline{W}$ | — | — | W | — | 1 | 0 | 0 | 0 | 1 | 0 | dilation |
| — | W | — | — | $\underline{W}$ | — | — | B | — | 1 | 0 | 0 | 0 | 1 | 0 | |
| — | — | B | $G_1$ | $\underline{W}$ | W | — | — | — | 1 | 0 | 0 | 0 | 1 | 1 | |
| — | — | — | W | $\underline{W}$ | $G_1$ | B | — | — | 1 | 0 | 0 | 1 | 0 | 0 | $G_1$ |
| B | $G_1$ | — | — | $\underline{W}$ | — | — | W | — | 1 | 0 | 0 | 1 | 0 | 1 | dilation-2 |
| — | W | — | — | $\underline{W}$ | — | — | $G_1$ | B | 1 | 0 | 0 | 1 | 0 | 1 | |
| — | — | B | $G_2$ | $\underline{W}$ | W | — | — | — | 1 | 0 | 0 | 1 | 1 | 0 | |
| — | — | — | W | $\underline{W}$ | $G_2$ | B | — | — | 1 | 0 | 0 | 1 | 1 | 1 | $G_2$ |
| B | $G_2$ | — | — | $\underline{W}$ | — | — | W | — | 1 | 0 | 1 | 0 | 0 | 0 | dilation-2 |
| — | W | — | — | $\underline{W}$ | — | — | $G_2$ | B | 1 | 0 | 1 | 0 | 0 | 0 | |
| — | — | — | B | $\underline{G_1}$ | W | — | — | — | 1 | 0 | 1 | 0 | 0 | 1 | $G_1$ |
| — | — | — | W | $\underline{G_1}$ | B | — | — | — | 1 | 0 | 1 | 0 | 1 | 0 | dilation-1 |
| — | B | — | — | $\underline{G_1}$ | — | — | W | — | 1 | 0 | 1 | 0 | 1 | 1 | erosion-1 |
| — | W | — | — | $\underline{G_1}$ | — | — | B | — | 1 | 0 | 1 | 0 | 1 | 1 | |
| — | — | — | B | $\underline{G_2}$ | W | — | — | — | 1 | 0 | 1 | 1 | 0 | 0 | $G_2$ |
| — | — | — | W | $\underline{G_2}$ | B | — | — | — | 1 | 0 | 1 | 1 | 0 | 1 | dilation-1 |
| — | B | — | — | $\underline{G_2}$ | — | — | W | — | 1 | 0 | 1 | 1 | 1 | 0 | erosion-1 |
| — | W | — | — | $\underline{G_2}$ | — | — | B | — | 1 | 0 | 1 | 1 | 1 | 0 | |
| — | — | — | B | $\underline{B}$ | W | — | — | — | 1 | 0 | 1 | 1 | 1 | 1 | |
| — | — | — | W | $\underline{B}$ | B | — | — | — | 1 | 1 | 0 | 0 | 0 | 0 | binary |
| — | B | — | — | $\underline{B}$ | — | — | W | — | 1 | 1 | 0 | 0 | 0 | 1 | erosion |
| — | W | — | — | $\underline{B}$ | — | — | B | — | 1 | 1 | 0 | 0 | 0 | 1 | |
| — | — | W | $G_1$ | $\underline{B}$ | B | — | — | — | 1 | 1 | 0 | 0 | 1 | 0 | |
| — | — | — | B | $\underline{B}$ | $G_1$ | W | — | — | 1 | 1 | 0 | 0 | 1 | 1 | $G_1$ |
| W | $G_1$ | — | — | $\underline{B}$ | — | — | B | — | 1 | 1 | 0 | 1 | 0 | 0 | erosion-2 |
| B | — | — | — | $\underline{B}$ | — | — | $G_1$ | W | 1 | 1 | 0 | 1 | 0 | 0 | |
| — | — | W | $G_2$ | $\underline{B}$ | B | — | — | — | 1 | 1 | 0 | 1 | 0 | 1 | |
| — | — | — | B | $\underline{B}$ | $G_2$ | W | — | — | 1 | 1 | 0 | 1 | 1 | 0 | $G_2$ |
| W | $G_2$ | — | — | $\underline{B}$ | — | — | B | — | 1 | 1 | 0 | 1 | 1 | 1 | erosion-2 |
| — | B | — | — | $\underline{B}$ | — | — | $G_2$ | W | 1 | 1 | 0 | 1 | 1 | 1 | | where the respective binary values for the pixels are White = 00, $G_1$ = 01, $G_2$ = 10, and Black = 11.

The patterns depicted in Table A represent the patterns identified for the white, gray (2) and black center pixel patterns, and are represented schematically by blocks 124 in FIG. 11. The template matching gate array 111 identifies the patterns and generates a 4-bit code that is combined, at one of the blocks 124 with a 2-bit value to form a 6-bit code that is eventually passed to the block 134. More specifically, the template matching operation is divided into five levels of operation as denoted by the five horizontal groupings of operation blocks. Specifically, the template matching gate array 111 is Level 1, WA, WB, WC, G1, 62, BA, BB, BC, and N-M, blocks (collectively 124 and 132) constitute Level 2, W and B blocks are Level 3, the AT block is Level 4, and the FS block is Level 5. Template matching gate array 111, operating on the input 2-bit pixel, has the potential to -continued

| BB | black center pixel, right density adjustment |
| BC | black center pixel, upper or lower (center) density adjustment |
| N-M | outputs a value corresponding to type of center pixel, i.e., white, black, or gray1 / gray2 (the no match case). |

Illustrated to the right in FIG. 11 is the no-match (N-M) block 132, where those context pixel patterns not matched by the template matching patterns are treated. Table B reflects the N-M outputs for each of the four possible center pixels.

TABLE B

| INPUTS | | | | | | | | | OUTPUTS | | | | | | |
|---|---|---|---|---|---|---|---|---|---|---|---|---|---|---|---|
| $X_0$ | $X_1$ | $X_2$ | $X_3$ | $X_4$ | $X_5$ | $X_6$ | $X_7$ | $X_8$ | $B_5$ | $B_4$ | $B_3$ | $B_2$ | $B_1$ | $B_0$ | COMMENTS |
| — | — | — | — | W | — | — | — | — | 0 | 0 | 0 | 0 | 0 | 1 | |
| — | — | — | — | G1 | — | — | — | — | 0 | 0 | 0 | 0 | 1 | 0 | no match |
| — | — | — | — | G2 | — | — | — | — | 0 | 0 | 0 | 0 | 1 | 1 | cases |
| — | — | — | — | B | — | — | — | — | 0 | 0 | 0 | 1 | 0 | 0 | |

The Level 3 blocks, W and B, determine the priorities for density modification and output a non-zero signal (if any) indicating the preferred modification. Note that for the G1 and G2 blocks, this prioritization operation occurs in Level 2. At Level 4, the AT block operates so that only one of the signals from blocks W, G1, G2, or B can be non-zero, and the AT block output is found by simply summing the inputs, bit-by-bit. At Level 5 the FS block establishes a final priority between the outputs of the AT block and the N-M block. Highest priority is the AT block output, followed by the N-M output. As the N-M output is always non-zero, a valid output must occur.

Referring again to FIG. 9, at each entry of the AT LUT 114 is stored a downloaded 8-bit data value that characterizes the width and position of the pulse that is to be produced by the exposure device. The 8-bit value is then delivered to the PWPM device 116 to drive the output engine. In the 8-bit PWPM data, 2 bits are employed to define the position of the pixel (right, left or center) while the remaining 6 bits are used to define the width of the pulse in $2^6$ increments. In particular, the PMPW block 116 determines the position of the pulse as follows:

| $B_1$ | $B_2$ | |
|---|---|---|
| 0 | 0 | No modulation |
| 0 | 1 | DEM - dual edge modulation |
| 1 | 0 | LEM - leading edge modulation |
| 1 | 1 | TEM - trailing edge modulation |

Figure 13:
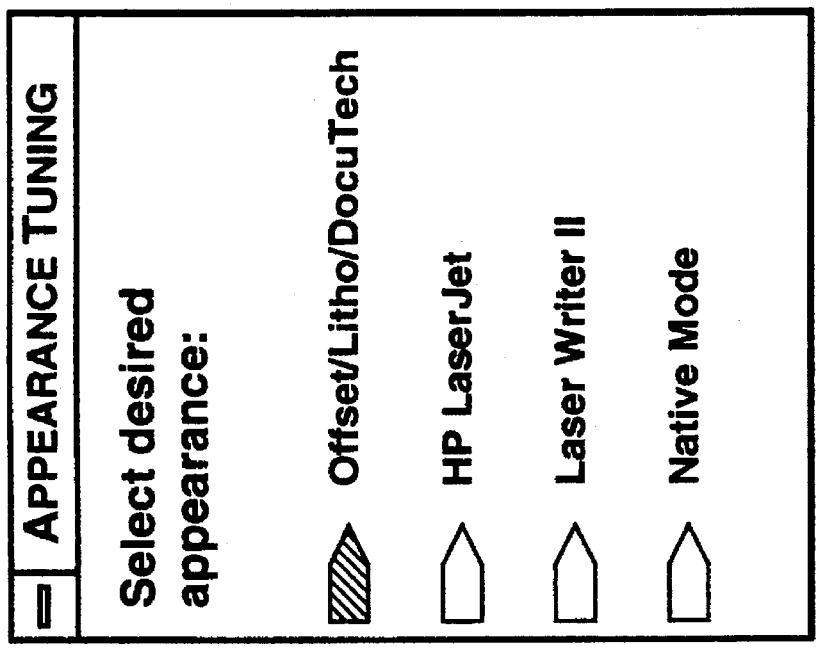
FIG. 13 is an exemplary user interface window suitable for making an appearance tuning selection in accordance with another aspect of the present invention.
Figure 12:
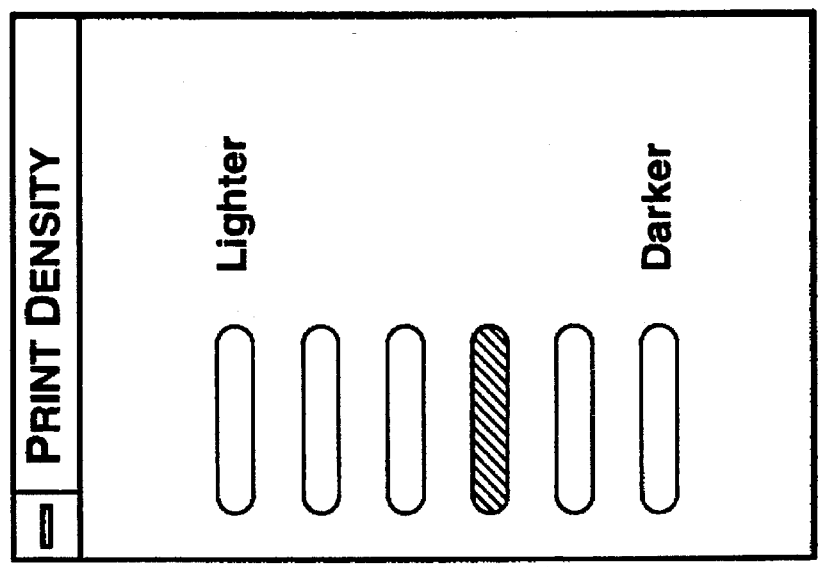
FIG. 12 is an exemplary user interface window suitable for making a density selection in accordance with one aspect of the present invention.

As previously noted, the data values for LUT 114 may be downloaded. In one embodiment, such values may be selectively downloaded in response to a user specification for the darkness-lightness of the output to be produced. In an alternative embodiment, the values may be supplied to the printing system by a transmission that is either part of, or in addition to, the transmission of the bitmap image data to be printed. Although not specifically illustrated, it is well-known that the printer user interface and/or a computer workstation window may be employed to allow a user to select the desired darkness-lightness characteristics for the output as illustrated in FIG. 12. It is to be further understood that such a selection may take the form of a selection of the printer characteristics to be "emulated" as indicated in FIG. 13. In both FIGS. 12 and 13, a user would select the desired characteristics (density level or printer emulation, respectively) using a pointing device as is well-known in the computer arts. Once selected, the appropriate LUT values would be retrieved from a memory device and transmitted so as to be downloaded into LUT 114. Hence, the downloaded values would be used to tune the appearance of the output image until a subsequent operation changed the values loaded therein.

In recapitulation, the present invention is a method and apparatus for tuning the appearance of bitmap images rendered on a printing system. The invention operates to recognize those pixels with a bitmap image that are appropriate for alteration and, in response to downloadable output values, tunes the identified pixels so as to assure a desired output thereof.

It is, therefore, apparent that there has been provided, in accordance with the present invention, a method and apparatus for tuning the appearance of a bitmap image so as to enable the user of a printing system to control the density (darkness/lightness) of the text and line art portions of documents printed thereon. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

I claim:

1. A method for selectively tuning the printed output of an electronic printing system capable of producing printed output from a print engine in response to a bitmap image, consisting of a plurality of input image signals, comprising the steps of:

selecting, in response to a user identified tuning characteristic, values for downloading to a programmable look-up table from a memory wherein the user identified tuning characteristic comprises a printer selected by the user for emulation by the electronic printing system;

transferring the selected values to the look-up table for processing of the bitmap image for printing;

storing, in memory, at least a portion of the input image signals forming the bitmap image;

identifying, using a template matching operation applied to the signals stored in the bitmap image memory, pixel values associated with pixel positions to be selectively tuned;

for those pixel positions identified to be selectively tuned, producing a pixel code and transmitting the pixel code to a programmable look-up table to generate a pulse-width position-modulated output signal that is supplied to the print engine; and passing the pulse-width position-modulated output signal signals directly to the print engine.

2. The method of claim 1, wherein the memory is external to the printing system and where the step of transferring the selected values to the look-up table comprises transmitting the selected values from the external memory to the printing system and downloading the selected values to the look-up table.

3. The method of claim 1, wherein the memory is found within the printing system and where the step of transferring the selected values to the look-up table comprises downloading the selected values from the memory to the look-up table.

4. The method of claim 1, wherein the step of identifying pixel values associated with pixel positions to be selectively tuned comprises the steps of:

comparing the values of pixels within a predefined context window against a plurality of templates;

providing a positive signal indicating the occurrence of a match between the values of pixels within the context window and one of the plurality of templates, otherwise providing no positive indication of a match.

5. The method of claim 1, wherein the bitmap image is represented as multiple bit per pixel data.

6. An apparatus for selectively tuning the output of an electronic printing system capable of producing printed output from a print engine in response to a bitmap image consisting of a plurality of multi-bit input image signals, comprising:

a user interface, associated with the electronic printing system, said user interface enabling the selection of a user identified tuning characteristic;

a bitmap image memory for storing at least a portion of the plurality of multi-bit input image signals;

a multi-level template matching logic circuit to identify, within the bitmap image memory, image signals associated with pixel positions to be selectively tuned;

a pixel code generator, responsive to said template matching logic circuit, for generating a pixel code for each pixel position identified to be selectively tuned; and a look-up table, responsive to the pixel code received from said pixel code generator, for generating a pulse width position modulated output signal that is supplied to the print engine to control the output thereof, wherein said look-up table is programmable and includes data programmed in response to the user identified tuning characteristic.

7. The apparatus of claim 6, further including means for bypassing the pixel code generator and look-up table to send the bitmap signals directly to the print engine for those pixels positions not identified by the template matching logic circuit.

8. The apparatus of claim 6, wherein said bitmap image memory comprises a two-dimensional array of memory locations.

9. The apparatus of claim 8, wherein said array of memory locations is a 3×3 array capable of storing image signals for a target pixel position and eight neighboring pixel positions.

10. The apparatus of claim 6, wherein said template matching logic circuit operates on a two-dimensional context window.

11. The apparatus of claim 10, wherein said two-dimensional context window is in the shape of a "+".

12. The apparatus of claim 10, wherein said template matching logic circuit includes a gate array suitable for comparing a plurality of template patterns to the input signals within the context window to produce a predetermined output in response to the detection of a match between the template pattern and the context window.

13. The apparatus of claim 12, wherein said gate array is a multi-level logic device, including:

a template matching level;

a target pixel characterization level, responsive to the template matching level, to classify the state of the target pixel once a template pattern match is detected;

a white-black prioritization level for establishing a preferred modification of the target pixel in a case when the context window matches a plurality of template patterns;

an appearance tuning level operating to assure that only one of the signals input thereto can be non-zero by summing the inputs; and a final selection level for selecting between the outputs of the appearance tuning level and a no-match condition detected in the target pixel characterization level.

14. An apparatus for selectively tuning the output of an electronic printing system capable of producing printed output from a print engine in response to a bitmap image consisting of a plurality of input image signals, comprising:

a bitmap image memory for storing at least a portion of the plurality of input image signals for a context window;

a template matching logic circuit to identify, within the bitmap image memory, image signals associated with pixel positions to be selectively tuned, wherein said template matching logic circuit includes a gate array and the gate array is a multi-level logic device, including:

a template matching level, a target pixel characterization level, responsive to the template matching level, to classify the state of the target pixel once a template pattern match is detected, a white-black prioritization level for establishing a preferred modification of the target pixel in a case when the context window matches a plurality of template patterns, an appearance tuning level operating to assure that only one of the signals input thereto can be non-zero by summing the inputs, and a final selection level for selecting between the outputs of the appearance tuning level and a no-match condition detected in the target pixel characterization level;

a pixel code generator, responsive to said template matching logic circuit, for generating a pixel code for each pixel position identified to be selectively tuned; and a look-up table, responsive to the pixel code received from said pixel code generator, for generating a pulse width position modulated output signal that is supplied to the print engine to control the output thereof.

* * * * *